(12) United States Patent
Steinmeier et al.

(10) Patent No.: US 9,487,117 B2
(45) Date of Patent: Nov. 8, 2016

(54) METHOD FOR PRODUCING A CUSHION ELEMENT AND METHOD AND TOOL FOR THE PRODUCTION THERETO

(75) Inventors: Horst Steinmeier, Lubbecke (DE); Alexander Hasler, Karlsruhe (DE); Dominik Stoll, Salzkotten (DE)

(73) Assignee: Johnson Controls Technology Company, Holland, MI (US)

( * ) Notice: Subject to any disclaimer, the term of this patent is extended or adjusted under 35 U.S.C. 154(b) by 1516 days.

(21) Appl. No.: 14/004,397

(22) PCT Filed: Sep. 16, 2009

(86) PCT No.: PCT/EP2009/006686
§ 371 (c)(1),
(2), (4) Date: Jan. 30, 2014

(87) PCT Pub. No.: WO2010/034424
PCT Pub. Date: Apr. 1, 2010

(65) Prior Publication Data
US 2014/0132054 A1    May 15, 2014

(30) Foreign Application Priority Data

Sep. 23, 2008  (DE) .................. 10 2008 048 591
Mar. 25, 2009  (DE) .................. 10 2009 014 881

(51) Int. Cl.
*B60N 2/64*    (2006.01)
*B29C 44/04*   (2006.01)

(52) U.S. Cl.
CPC ............. *B60N 2/64* (2013.01); *B29C 44/0469* (2013.01)

(58) Field of Classification Search
CPC ..... B60N 2/64; B29C 44/0461; B29C 44/64; B29C 44/04; B29C 44/16; B29C 44/148; B29C 44/1276

USPC ......... 264/46.4, 46.5, 46.6, 45.6, 45.3, 45.1, 264/241, 254, 260, 271.1, 279.1
See application file for complete search history.

(56) References Cited

U.S. PATENT DOCUMENTS 3,320,339 A * 5/1967 Smith .......................... 264/45.1
4,927,575 A * 5/1990 Brock ................. B29C 44/0469
                                                    264/45.1

(Continued)

FOREIGN PATENT DOCUMENTS

DE        198 44 307 A1    9/1999
DE        100 16 350 A1    10/2001
DE    10 2004 018 001 A1   11/2005

*Primary Examiner* — Stella Yi
(74) *Attorney, Agent, or Firm* — Fletcher Yoder, P.C.

(57) ABSTRACT

A method for producing a cushion element for a vehicle seat, in which a component suitable for forming a three-dimensional separation zone is inserted in a tool, subsequently at least one first foamable mass is introduced into a first space of the tool. On foaming the mass, the component forms a three-dimensional separating element between a first foamed cushion region and a further space within the tool. The component is pressed against a counter-support in the tool during the forming to give a three-dimensional separating element. A suitable tool comprises an upper tool, a lower tool and a counter support for contacting a component taking on a three-dimensional shape. By introducing the three-dimensional mouldable shape into the tool and the subsequent forming thereof to give a three-dimensional separating element, complex formed regions with differing properties, in particular, differing degrees of hardness can be economically generated in a foamed cushion element.

7 Claims, 3 Drawing Sheets

(56) References Cited

U.S. PATENT DOCUMENTS

| | | | |
|---|---|---|---|
| 5,176,860 A * | 1/1993 | Storch | B29C 44/1257 264/255 |
| 7,252,341 B2 | 8/2007 | Kircher et al. | |
| 2003/0180513 A1 | 9/2003 | Steinmeier | |

* cited by examiner

METHOD FOR PRODUCING A CUSHION ELEMENT AND METHOD AND TOOL FOR THE PRODUCTION THERETO

CROSS REFERENCE TO RELATED APPLICATIONS

This application claims priority from and the benefit of PCT Application No. PCT/EP2009/006686, filed on Sep. 16, 2009; German Patent No. DE 10 2008 048 591.8, filed on Sep. 23, 2008; and German Patent No. DE 10 2009 014 881.7, filed on Mar. 25, 2009; all entitled "Method for Producing a Cushion Element and Method and Tool for the Production Thereof", which are herein incorporated by reference.

BACKGROUND

The invention relates to a method for producing a cushion element, in particular for a vehicle seat, in which a component suitable for forming a three-dimensional separating zone is placed into a die and subsequently at least one first foamable compound is introduced into a first space region in the die, wherein, during the foaming of said compound, the component is shaped to form a three-dimensional separating element between a first foamed cushion region and a further space region in the die. The invention furthermore relates to a die suitable for carrying out the method and to a cushion element manufactured therewith.

PRIOR ART

A cushion element of the type mentioned at the beginning is known from laid-open application DE 100 16 350 A1. The cushion element provided for use in seat parts or backrests of vehicle seats consists of a first and a second foamed region, which are separated spatially from each other by a network in the form of a gauze, a nonwoven fabric or the like. The network may be designed to be either preshaped two-dimensionally or else three-dimensionally in the form of a pocket.

According to a development of the method disclosed there, the pocket is clamped over an open die into which a foamable flexible foam compound has already been placed. The pocket is filled with a foamable rigid foam compound and bulges during the foaming of said compound, forming a three-dimensional separating element which separates the rigid foam spatially from the flexible foam Although comfortable cushion elements having different zones of hardness can be manufactured by using said method, the spatial design options are limited. Furthermore, the clamping of the pocket in the die filled with the already foaming flexible foam compound is complicated.

DE 10 2004 018 001 B4 describes a vehicle seat in which an adaptor-like frame element manufactured separately from rigid polyurethane foam is placed onto the metallic structure of the seat part. A seat cushion pad which is likewise produced separately and completely or partially covers the frame element is subsequently placed onto the frame element. The arrangement of the seat cushion pad and frame element is subsequently provided with a cover. In this case, the front transverse strut of the frame element is designed to rise to the front in the shape of a ramp and is intended to prevent a seat occupant from plunging under the lap-side strand of the seatbelt (anti-submarining) A procedure of this type is extremely costly because of the high number of components manufactured independently of one another.

Furthermore, laid-open application DE 198 44 307 A1 discloses a vehicle seat, the seat cushion of which is provided in the front region with an insert in the form of a deformation body. The inset consists of an open-pore foam, the stiffness of which depends on the speed of deformation and which is fully embedded into the seat cushion. In this document, no statement is made regarding the manufacturing of this assembly.

SUMMARY

Problem

The invention is based on the problem of providing a method and a die for producing a cushion element having great freedom of design and also permitting the formation of safety devices of complex shape, in particular an anti-submarining ramp, with little manufacturing outlay.

Solution

The problem is solved in a method of the generic type in that, during the shaping to form the three-dimensional separating element, the component is pressed against an abutment in the die. A die suitable for carrying out the method is distinguished in that the die has at least a top die, a bottom die and an abutment for a component shaped three-dimensionally to bear against.

By placing the three-dimensionally deformable sheet-like structure into the die and the subsequent shaping thereof to form a three-dimensional separating element, zones of complex shape and having different properties, and in particular different hardnesses, can be formed cost-effectively in a foamed cushion element. Said zones may in particular constitute special safety features of a vehicle seat, but also may have a positive effect on the seating comfort of the cushion element with respect to hardness or ventilation.

The dependent claims relate to preferred embodiments of the invention.

With respect to the method, it is advantageously provided that a component which is suitable for forming a three-dimensional separating zone is placed into the foaming die, subsequently at least a first foamable compound is introduced into a first space region and a second foamable compound is introduced into a second space region and, during the foaming of said compounds, the component is shaped to form a three-dimensional separating element between a first foamed cushion region and a second foamed cushion region of the cushion element. The different foam zones are therefore foamed close in time, thus enabling the cycle times in the manufacturing of the cushion to be shortened. The foaming pressures in the different zones here should be dimensioned in such a manner that the separating element is shaped in the desired direction.

According to a further advantageous procedure, the component is placed already in three-dimensional form into the die before the foamable compounds are introduced. In this case, the component may consist, for example, of a stitched or at least partially preshaped sheet-like structure such that lower demands are imposed on the deformability over the course of the further skill and also zone profiles of particularly complex shape can be formed with less expandable sheet-like structures.

By contrast, an alternative procedure, in which the component is placed substantially two-dimensionally, for example in the form of a simple textile blank, into the die before the foamable compounds are introduced, is particular cost-effective.

In both case, provision can be made for the component to be clamped so as to be capable of slipping in the die before the foamable compounds are introduced. The separating element is therefore not, or at least not only, shaped three-dimensionally by means of expansion of the sheet-like structure but by feeding of an excess length of the blank into the die. Folds which may occur in the separating element in the process are not of importance.

A preferred die for carrying out the above-described method is characterized in that it has means for receiving the component which is deformed three-dimensionally, in particular a slip frame. Said slip frame comprises the blank for the separating element completely or at least in substantial circumferential regions and thereby ensures a precise arrangement of the component in the die. The excess length of the blank protrudes outward out of the slip frame and is drawn into the interior of the frame and therefore in the direction of the die cavity during the foaming operation without loss of the slipping force.

In this case, a slip frame which is formed directly between the top die and bottom die and automatically grasps the blank when the die is closed is particularly simple structurally. In principle, however, it is also conceivable to provide a separate slip frame which surrounds the die such that the clamping of the blank can be checked and possibly corrected before the die is closed.

According to an advantageous embodiment, the abutment for the component which is deformed three-dimensionally to bear against is connected releasably to the top and/or bottom die of the die. When forming an anti-submarining ramp, the abutment can consist, for example, of a three-dimensionally shaped sheet-metal component provided with apertures. As an alternative, an advantageous development of the die is conceivable, in which the abutment is connected fixedly to the die and consists of a multiplicity of, for example, conical pins which protrude into the cavity of the die and the free ends of which are provided for the component to bear against. After the pins have been withdrawn, radially extending channels arise in the cushion body, said channels not having a negative influence on the cushion body properties and even being able to improve the latter in respect of the seat climate.

An advantageous cushion element is distinguished in that the first foamed cushion region is harder than the second foamed cushion region, wherein the upper side of the first foamed cushion region is advantageously designed in the shape of a ramp and such that it rises toward the front edge of the seat. This produces an anti-submarining ramp in a simple and nevertheless effective manner.

In order to improve the comfort, the second foamed cushion region is preferably designed in such a manner that it at least partially covers the first foamed cushion region from above.

However, provision may advantageously be made for the first foamed cushion region to extend as far as a surface side, in particular the lower side of the cushion element. This simplifies the introduction of the foamable compound, which is provided for forming the first cushion region, into the die without losses in respect of the comfort having to be accepted. In principle, however, it would also be conceivable to inject the first foamable compound by means of a lance into a separating element which is preshaped to be closed, for example is spherical and which is kept at a distance from the die walls by the abutment during the manufacturing.

The separating element is advantageously of gas-permeable design, and therefore, during the foaming operation, gas escaping from the foamable compound, and the air displaced from the expanding front of the foam can be removed from the die via all of the space regions thereof. This avoids undesirable voids or defectively foamed cushion regions, In a countermove, the separating element preferably not only provides an increased flow resistance to the foamable compound but is designed to be substantially tight with respect to the foamable compounds used for producing the first or second foamed region. This causes a particularly clear separation between the foam zones.

In particular, a textile sheet-like structure, for example a nonwoven, woven or knitted fabric, which can be provided cost-effectively and does not significantly influence the seating comfort during subsequent use of the cushion element is suitable for use as the separating element.

DRAWINGS

The figures illustrate various embodiments of the invention by way of example and schematically.

DETAILED DESCRIPTION

Figure 1:
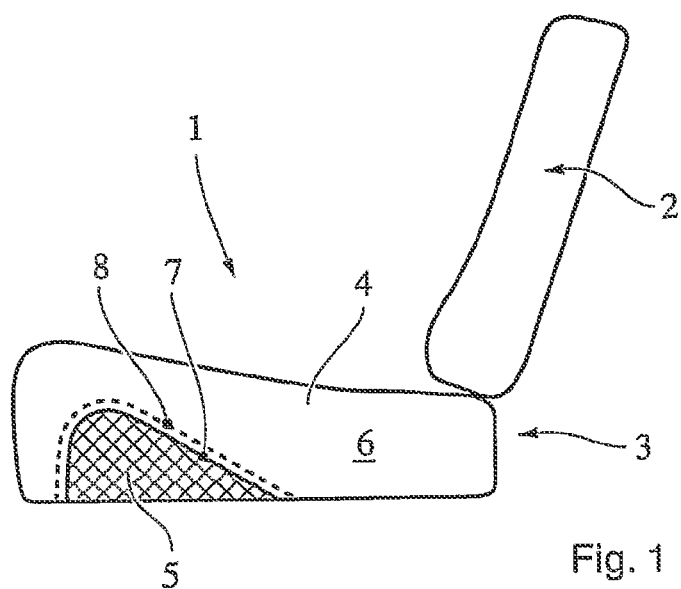
FIG. 1 shows a vehicle seat with a seat cushion designed according to the invention.

The motor vehicle seat 1 shown in FIG. 1 consists of a backrest 2 and a seat cushion 3, the cushion element 4 of which has a first foamed cushion region 5 consisting of a relatively rigid foam and a second foamed cushion region 6 consisting of a relatively flexible foam. The rigid cushion region 5 extends substantially in the front part of the cushion element 4. In this case, the upper surface 7 of the cushion region 5 rises in the manner of ramp from the rear to the front and forms a device to prevent the seat occupant from plunging through the seatbelt.

Directional and positional details refer to the customary installation position of a motor vehicle seat.

A textile, three-dimensionally shaped separating element 8 is arranged between the first cushion region 5 and the second cushion region 6, said separating element being gas-permeable but being impermeable to the liquid, foamable compounds provided for forming the cushion regions 5 and 6.

Figure 2:
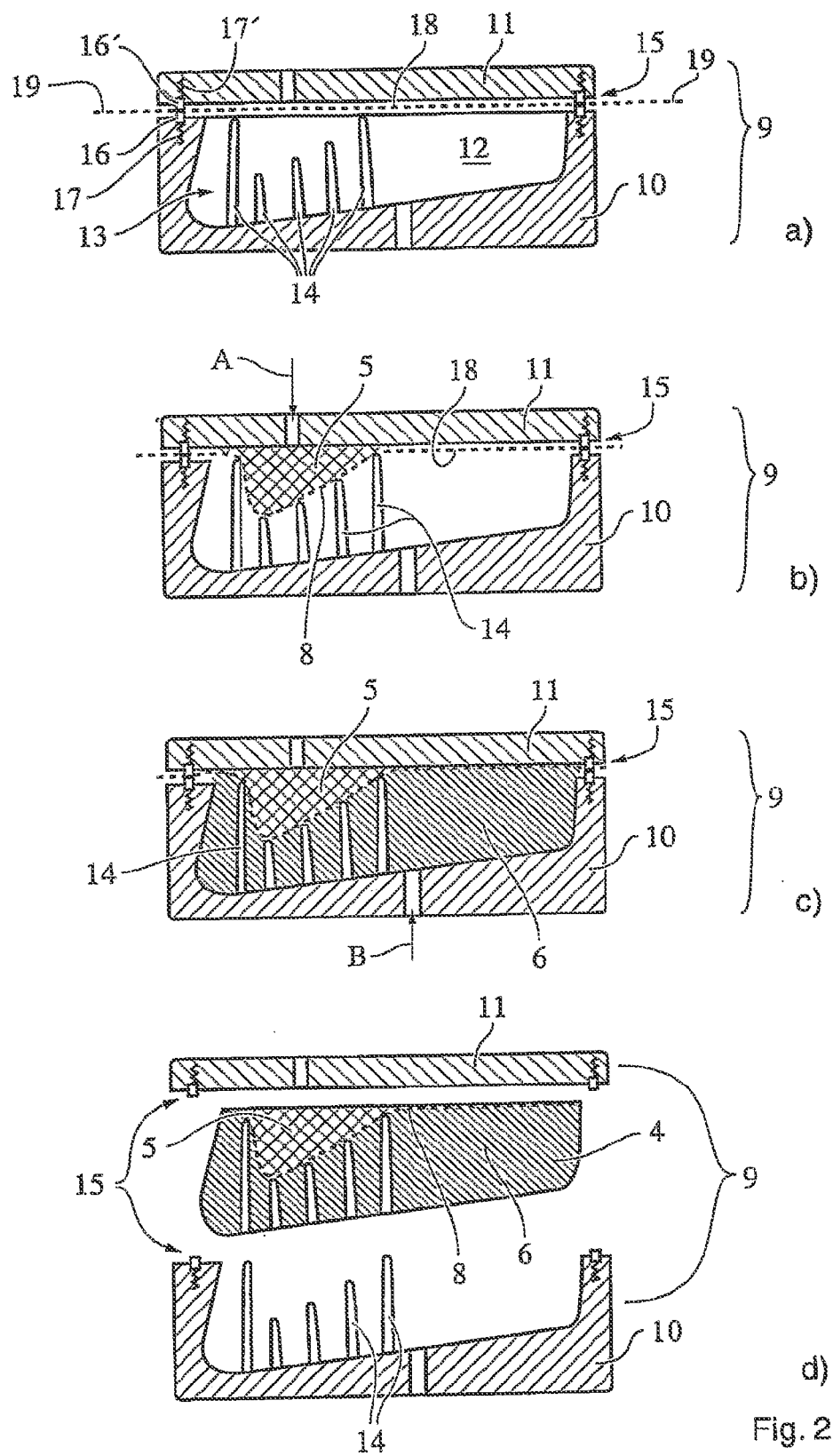
FIG. 2 shows the process sequence when using a first method according to the invention and a die according to one embodiment of the invention (FIG. 2a-d)

FIG. 2 illustrates the sequence during the manufacturing of a cushion element 4 of this type and a die 9 suitable for this purpose. The die 9 consists of a tub-like bottom die 10 and a cover-shaped top die 11, which together form a cavity 12 for filling with the foamable compounds. The seat part 4 is manufactured here rotated through 180° with respect to the subsequent installation position, and therefore the seat surface points downward during manufacturing. In the transition between the cushion regions 5 and 6, the bottom die 10 is provided with an abutment 13 which consists of a number of conically tapered pins 14 which differ in length and extend upward in the cavity 12 from the bottom die 10. Furthermore, a slip frame 15 is arranged in the transition region between the bottom die 10 and top die 11. Said slip frame consists of frame parts 16, 16' which are assigned to the bottom die 10 and to the top die 11 and can be clamped onto each other via springs 17, 17'.

At the start of the process cycle, those surfaces of the die 9 which face the cavity 12 are sprayed with a separating agent. Subsequently, a component 18 which is cut two-dimensionally and is provided for forming the separating element 8 is placed between the bottom die 10 and top die 11 and the die 9 is closed. The component 18 is grasped here by the slip frame 15 with a slight prestress (FIG. 2a).

A first foamable compound (arrow A) is then introduced through an opening in the top die 11 into that part of the cavity 12 in which the first, relatively hard cushion region 5 is formed (FIG. 2b). The pressure of the foaming compound presses the component 18, which was hitherto planar, against the abutment 13 and deforms said component to form the three-dimensional separating element 8, with a projecting length 19 of the blank being drawn through the frame parts 16, 16' which are clamped against each other. In this case, the slipping force is dimensioned such that said drawing-through operation takes place without the component 18 being damaged, but the separating element 8 is kept under stress such that it is pressed without bulging significantly into the gaps between the pins 14.

The foamable compound for the flexible, foamed cushion region 6 is subsequently fed via the bottom die 10 into the cavity (arrow B) and fills the remaining hollow space (FIG. 2c). After the top die 11 is opened (FIG. 2d), the cushion element 4 can be removed from the die 9, wherein the pins 14 which form the abutment 13 are withdrawn from the cushion element 4 with channels being formed in the foam part. The component 18 remains permanently as the separating element 8 in the cushion element 4. In principle, the foamable compounds (arrows A, B) can also be fed in closely in time or even at the same time if the resultant foaming pressures press the component 18 against the abutment 13 in the manner shown.

Figure 3:
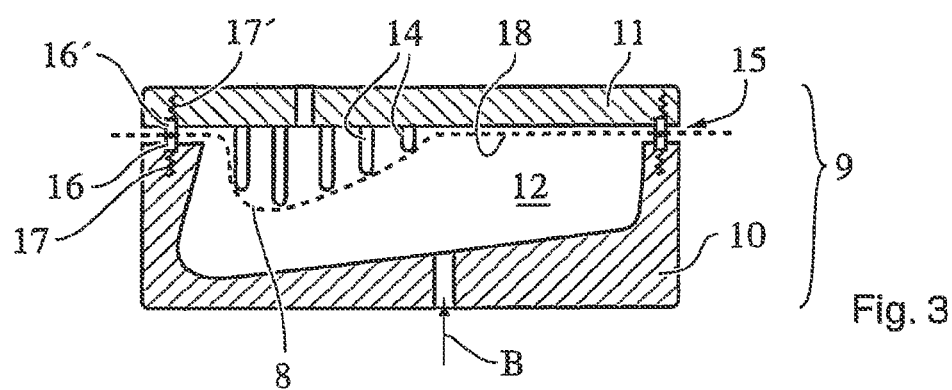
FIG. 3 shows the design of an alternative die.

In the die 9 shown in FIG. 3, the pins 14 forming the abutment 13 are arranged on the top die 11 and protrude downward into the cavity 12. The component 18 is first of all pressed upward against the pins 14 by the compound (arrow B) which is supplied by the bottom die 10 and is intended for forming the flexible, foamed cushion region 6 and, in the process, forms the separating element 8.

Figure 4:
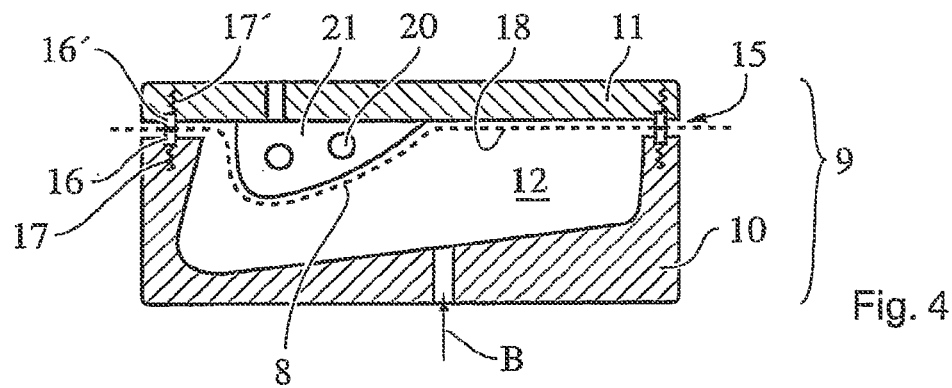
FIG. 4 shows a die according to another preferred embodiment of the invention.

The die 9 according to FIG. 4 differs from the embodiment according to FIG. 3 in that the abutment 13 is formed by a three-dimensional sheet-metal part 21 which is provided with apertures 20 and against which the component 18 forming the separating element 8 is pressed under the pressure of the compound (arrow B), which is supplied from below, for the flexible, foamed cushion region 6. The die 9 is subsequently opened and the sheet-metal part 21 removed. After the die 9 is closed again, the rigid cushion region 5 can be foamed.

The invention claimed is:

1. A method for producing a cushion element, in which a component configured to form a three-dimensional separating zone is placed into a die and subsequently at least one first foamable compound is introduced into a first space region in the die, wherein during foaming of the at least one first foamable compound, the component is shaped to form a three-dimensional separating element between a first foamed cushion region and a second space region in the die, and wherein the second space region remains hollow during the foaming of the at least one first foamable compound;

wherein the component is placed substantially two-dimensionally into the die before the at least one first foamable compound is introduced, and during the shaping to form the three-dimensional separating element, the component is pressed against an abutment in the die; and wherein before the at least one first foamable compound is introduced, the component is clamped so as to be capable of slipping in the die.

2. The method for producing a cushion element as claimed in claim 1, wherein a second foamable compound is introduced into the second space region in the die.

3. The method as claimed in claim 1, wherein the abutment is removed from the cushion element during the manufacturing thereof.

4. The method as claimed in claim 1, wherein the cushion element is for a vehicle seat.

5. A method for producing a cushion element, in which a component configured to form a three-dimensional separating zone is placed into a die, and subsequently a first foamable compound is introduced into a first space region in the die, and a second foamable compound is introduced into a second space region in the die, wherein during foaming of the first and second foamable compounds, the component is shaped to form a three-dimensional separating element between a first foamed cushion region and a second foamed cushion region of the cushion element;

wherein the component is placed two-dimensionally into the die before the first and second foamable compounds are introduced; and wherein before the first and second foamable compounds are introduced, the component is clamped so as to be capable of slipping in the die, and wherein during the shaping to form the three-dimensional separating element, the component is pressed against an abutment in the die.

6. The method as claimed in claim 5, wherein the abutment is removed from the cushion element during the manufacturing thereof.

7. The method as claimed in claim 5, wherein the cushion element is for a vehicle seat.

\* \* \* \* \*